US009564840B2

(12) United States Patent
Takahashi

(10) Patent No.: US 9,564,840 B2

(45) Date of Patent: Feb. 7, 2017

(54) POWER SOURCE DEVICE

(71) Applicant: HONDA MOTOR CO., LTD., Tokyo (JP)

(72) Inventor: Tadanobu Takahashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/441,132

(22) PCT Filed: Nov. 8, 2013

(86) PCT No.: PCT/JP2013/080191

§ 371 (c)(1),
(2) Date: May 6, 2015

(87) PCT Pub. No.: WO2014/073632

PCT Pub. Date: May 15, 2014

(65) Prior Publication Data

US 2015/0303838 A1 Oct. 22, 2015

(30) Foreign Application Priority Data

Nov. 9, 2012 (JP) ................................ 2012-247883

(51) Int. Cl.
*H02P 27/00* (2006.01)
*H02P 6/00* (2016.01)
(Continued)

(52) U.S. Cl.
CPC ................ *H02P 6/002* (2013.01); *B60L 7/14* (2013.01); *B60L 11/1803* (2013.01);
(Continued)

(58) Field of Classification Search
CPC ............ Y02T 10/7005; Y02T 10/7066; Y02T 10/645; Y02T 10/7216; Y02T 10/7275; Y02T 90/34; Y02T 10/705; B60L 11/1868; B60L 3/003; B60L 3/0061; B60L 11/1803; B60L 11/1887; B60L 15/2063; B60L 1/003
(Continued)

(56) References Cited

U.S. PATENT DOCUMENTS 5,349,517 A * 9/1994 Brennen .................. H02J 3/01 323/207
5,771,161 A * 6/1998 Jackson .................... H02J 3/01 307/64

(Continued)

FOREIGN PATENT DOCUMENTS

CN 102602299 A 7/2012
JP 2001136607 A 5/2001

(Continued)

OTHER PUBLICATIONS

International Search Report dated Jan. 7, 2014, issued in corresponding application No. PCT/JP2013/080191.

(Continued)

*Primary Examiner* — Paul Ip
(74) *Attorney, Agent, or Firm* — Westerman, Hattori, Daniels & Adrian, LLP

(57) ABSTRACT

A power source device includes a power source body including first and second secondary batteries and an inverter. When the power source connection status is switched from parallel to serial statuses, the motor generator is operated as a motor and the power source connection status is switched to a single second power source status, after switching to the first connection status in which the power source body and the first inverter are connected, the first motor generator operates as a motor, and power source connection status is switched to a single second power source status, and the inverter connection status is switched to a second connection status in which the power source
(Continued)

body in the single second power source status and the inverter are connected.

10 Claims, 12 Drawing Sheets

(51) Int. Cl.

| | |
|---|---|
| ***H02P 27/06*** | (2006.01) |
| ***B60L 7/14*** | (2006.01) |
| ***B60L 11/18*** | (2006.01) |
| ***H02P 5/74*** | (2006.01) |
| ***H02J 7/00*** | (2006.01) |
| ***H02P 23/00*** | (2016.01) |

(52) U.S. Cl.
CPC ......... *B60L 11/1855* (2013.01); *H02J 7/0024* (2013.01); *H02P 5/74* (2013.01); *H02P 23/00* (2013.01); *H02P 27/06* (2013.01); *B60L 2210/30* (2013.01); *B60L 2210/42* (2013.01); *B60L 2220/42* (2013.01); *B60L 2240/423* (2013.01); *B60L 2240/526* (2013.01); *B60L 2240/527* (2013.01); *B60L 2240/529* (2013.01); *B60L 2240/547* (2013.01); *Y02T 10/648* (2013.01); *Y02T 10/7005* (2013.01); *Y02T 10/7055* (2013.01); *Y02T 10/7241* (2013.01)

(58) Field of Classification Search
USPC ..... 318/400.28, 400.3; 363/40, 132; 307/9.1
See application file for complete search history.

(56) References Cited

U.S. PATENT DOCUMENTS

| | | | | | |
|---|---|---|---|---|---|
| 6,281,664 | B1 * | 8/2001 | Nakamura | H02P 9/307 | 322/20 |
| 6,787,931 | B2 * | 9/2004 | Nakagawa | F02N 11/04 | 290/31 |
| 6,813,167 | B2 * | 11/2004 | Nakamura | H02M 7/49 | 363/40 |
| 8,575,883 | B2 * | 11/2013 | Sone | B60L 11/1868 | 307/9.1 |
| 8,587,249 | B2 * | 11/2013 | Sone | B60L 1/003 | 307/9.1 |
| 2003/0025398 | A1 * | 2/2003 | Nakamura | H02M 7/49 | 307/72 |
| 2004/0036295 | A1 * | 2/2004 | Nakagawa | F02N 11/04 | 290/31 |
| 2011/0116293 | A1 * | 5/2011 | Tabata | H02M 7/487 | 363/132 |
| 2012/0187755 | A1 * | 7/2012 | Sone | B60L 1/003 | 307/9.1 |
| 2012/0187887 | A1 * | 7/2012 | Sone | B60L 11/1868 | 318/504 |
| 2012/0206076 | A1 * | 8/2012 | Tanaka | H02P 27/08 | 318/400.28 |
| 2012/0256611 | A1 * | 10/2012 | Fukui | B60L 3/003 | 323/304 |
| 2013/0110337 | A1 * | 5/2013 | Kondoh | B60L 11/1868 | 701/22 |

FOREIGN PATENT DOCUMENTS

| | | | | |
|---|---|---|---|---|
| JP | 2008-131830 | A | | 6/2008 |
| JP | 2010-057288 | A | | 3/2010 |
| JP | 2010183768 | A | | 8/2010 |
| JP | P2011-010584 | | * | 1/2011 |
| JP | 2012-60838 | A | | 3/2012 |
| JP | 2012060838 | A | | 3/2012 |
| JP | 2012-70514 | A | | 4/2012 |
| JP | 2012-152079 | A | | 8/2012 |

OTHER PUBLICATIONS

Extended (Supplementary) European Search Report (EESR) dated Aug. 17, 2016, issued in counterpart European Patent Application No. 13854115.6. (8 pages).

Office Action dated Oct. 10, 2016, issued in counterpart Chinese Patent Application No. 201380056470.3, with English translation. (11 pages).

* cited by examiner

POWER SOURCE DEVICE

TECHNICAL FIELD

The present invention relates to a power source device.

BACKGROUND ART

A power source device is known which includes, for example, four relays, i.e., first to fourth relays, two secondary batteries, a boost converter in which connection of the two secondary batteries are switched between a series connection state and a parallel connection state relative to an electric load while the voltage applied to the electric load is adjusted by the boost converter (see Patent Document 1).

In addition, a power source device is known which includes, for example, four first to fourth switching devices, two reactors, and two DC power sources in which connection of the two DC power sources are switched between a series connection status and a parallel connection status relative to an electric load while the voltage applied to the electric load is adjusted (see Patent Document 2).

PRIOR ART PATENT DOCUMENT

Patent Document 1: JP2012-60838A
Patent Document 2: JP2012-70514A

SUMMARY OF INVENTION

Problem to be Solved by Invention

However, the power source device disclosed in Patent Document 1 only changes connection between two connection statuses of the two secondary batteries, i.e., the series connection status and the parallel connection status. In other words, to efficiently drive the electric load, it is desired to provide precise control while the range of the voltage applicable to the electric load is expanded.

In addition, the number of components required to configure the device is increased because the device is provided with the four, i.e., the first to fourth relays and the boost converter. This causes a problem in that the cost of configuring the device becomes increased with an increase in a scale of the device.

Further in the power source system of the Patent Document 2, for example, when the connection is changed from the parallel connection status to the series connection status, voltages of respective DC power sources are boosted to a series connection voltage (for example, a voltage about twice of each DC power source) in the series connection status. This results in a problem of an increase in maximum flux change and causes necessity of increasing a size of the reactor, and a problem of increase in the conduction loss because the two switching devices are included in the conduction paths in both the series connection status and the parallel connection status.

Further, in the power source system of Patent Document 2, a trend of the total number of interlinkage magnetic flux of the reactor changes to increase trend with an increase in the boosting ratio. Accordingly the loss increases and it becomes necessary to increase in size of the reactor.

The present invention aims to provide a power source device capable of suppressing a voltage variation during switching between the parallel connection and the series connection of the first power source and the secondary connection with simple structure.

Means for Solving Problem

To solve the problem, the present invention may provide a power source device comprising:

a power source body including a first power source and a second power source;

power source connection status switching means for making switching among a power source parallel connection status of the first and second power sources, a power source serial connection status of the first and second power sources, and a single second power source status in which only the second power source outputs;

an inverter connected to a motor generator; and an inverter connection status switching means for making switching between a first connection status in which the power source body being in the power source parallel connection status or the power source serial connection status is connected to the inverter and a second connection status in which the inverter is connected to the power source body in a single second power source status; wherein, when the power source connection status switching means makes the switching from the power source parallel connection status to the power source serial connection status, the switching to the power source serial connection status is made by the power source connection status switching means via a serial connection status between the second power source and the inverter operating as a power source by the motor generator functioning as a generator, and after the serial connection status, the power source connection status switching means makes the switching to the power source serial connection status, wherein the serial connection status is provided through:

the inverter connection status switching means making the switch to the first connection status to cause the inverter to operate the motor generator as a motor;

thereafter, the power source connection status switching means making the switching to the single second power source status; and the inverter connection status switching means making the switch to the second connection status.

According to the above configuration, when the power source connection status switching means makes switching from the power source parallel connection status to the power source serial connection status, the inverter connection status switching means makes switching to a first connection status so that the inverter operates the motor generator as a motor. Next, the power source connection status switching means makes switching to the single second power source status, and the inverter connection status switching means makes the switching to the second connection status to provide a serial connection between the second power source and the inverter which temporarily becomes a power source, as a transit status, after that, the power source status switching means makes switching to the power source serial connection status.

As described above, because the serial connection status of the second power source with the inverter which temporarily operates as a power source is made as a transit status, the variation in the voltage of the power source body becomes small.

Further, this is a configuration which can utilize the motor generator generally mounted on hybrid vehicles, etc.

To solve the problem, the present invention may provide a power source device comprising:

a power source body including a first power source and a second power source;

power source connection status switching means for making switching among a power source parallel connection status of the first and second power sources, a power source serial connection status of the first and second power sources, and a single second power source status in which only the second power source outputs;

an inverter connected to a motor generator; and an inverter connection status switching means for making switching between a first connection status in which the power source body being in the power source parallel connection status or the power source serial connection status is connected to the inverter and a second connection status in which the inverter is connected to the power source body in a single second power source status; wherein, when the power source connection status switching means makes the switching from the power source serial connection status to the power source parallel connection status, the switching to the power source serial connection status is made by the power source connection status switching means via a serial connection status between the second power source and the inverter operating as a power source by the motor generator functioning as a generator, and after the serial connection status, the power source connection status switching means makes the switching to the power source parallel connection status, wherein the serial connection status is provided through:

the inverter connection status switching means making the switch to the first connection status to cause the inverter to operate the motor generator as a motor;

thereafter, the power source connection status switching means making the switching to the single second power source status; and the inverter connection status switching means making the switch to the second connection status.

According to the configuration, when the power source connection status switching means makes switching from the power source serial connection status to the power source parallel connection status, the inverter connection status switching means makes switching to a first connection status, and the inverter operates the motor generator as a motor. Next the power source connection status switching means makes switching to the single second power source status, the inverter connection status switching means makes the switching to the second connection status as a transitional status, and thereafter the power source status switching means makes switching to the power source parallel connection status.

As described above, the serial connection status of the second power source with the inverter which temporarily operates a power source is provide as a transitive status, so that the voltage variation of the power source body becomes small.

Further, in the power source device, the first power source preferably comprises a first power source positive terminal and a first power source negative terminal.

The second voltage supply preferably comprises a second power source positive terminal and a second power source negative terminal.

The inverter preferably includes an inverter positive terminal and an inverter negative terminal.

The power source device is provided with:

a positive bus bar connected to the second power source positive terminal;

a negative bus bar is connected to the first power source negative terminal and the inverter negative terminal;

a first switch turning on and off connection between the first power source positive terminal and the positive bus bar;

a second switch turning on and off connection between the first power source positive terminal and the second power source negative terminal;

a third switch turning on and off connection between the positive bus bar and the inverter positive terminal;

a fourth switch turning on and off connection between the second power source negative terminal and the inverter positive terminal; and a fifth switch turning on and off connection between the second negative terminal and the negative bus bar.

To solve the problem, the present invention may provide a power source device comprising:

a power source body including a first power source and a second power source;

power source connection status switching means for making switching among a power source parallel connection status of the first and second power sources, a power source serial connection status of the first and second power sources, and a single second power source status in which only the second power source outputs;

an inverter connected to a generator; and inverter connecting means for making a connection in a serial connection status in which the power source body being in a single second source connection status is connected to the inverter in series;

drive power source controlling means for controlling a drive power source for rotating a rotor of the generator; wherein, when the power source connection status switching means makes the switching from the power source parallel connection status to the power source serial connection status, the switching to the power source serial connection status is made by the power source connection status switching means via a serial connection status between the second power source and the inverter operating as a power source by the generator operating, and after the serial connection status, the power source connection status switching means makes the switching to the power source serial connection status, wherein the serial connection status is provided through:

the drive power source controlling means rotates the rotor, thereafter, the power source connection status switching means makes the switching to the single second power source status, and the inverter connection status switching means makes the switching to the second connection status.

To solve the problem, the present invention may provide a power source device comprising:

a power source body including a first power source and a second power source;

power source connection status switching means for making switching among a power source parallel connection status of the first and second power sources, a power source serial connection status of the first and second power sources, and a single second power source status in which only the second power source outputs;

an inverter connected to a generator; and inverter connecting means for making a connection in a serial connection status in which the power source body being in a single second source connection status is connected to the inverter in series;

drive power source controlling means for controlling a drive power source for rotating a rotor of the generator; wherein, when the power source connection status switching means makes the switching from the power source serial connection status to the power source parallel connection status, the switching to the power source parallel connection status is made by the power source connection status switching means via a serial connection status between the second power source and the inverter operating as a power source by the generator operating, and after the serial connection status, the power source connection status switching means makes the switching to the power source serial connection status, wherein the serial connection status is provided through:

the drive power source controlling means rotates the rotor, thereafter, the power source connection status switching means makes the switching to the single second power source status, and the inverter connection status switching means makes the switching to the second connection status.

According to the configuration, the drive power control means rotates the rotor, so that the generator operates (power generation), which cause the inverter to be a power source by the operating generator.

Advantageous Effect of Invention

According to the present invention, a power source device is provided in which voltage variation during switching between the power source parallel connection and the power source serial connection of the first and second power sources with a simple configuration.

MODES FOR CARRYING OUT INVENTION

Figure 1:
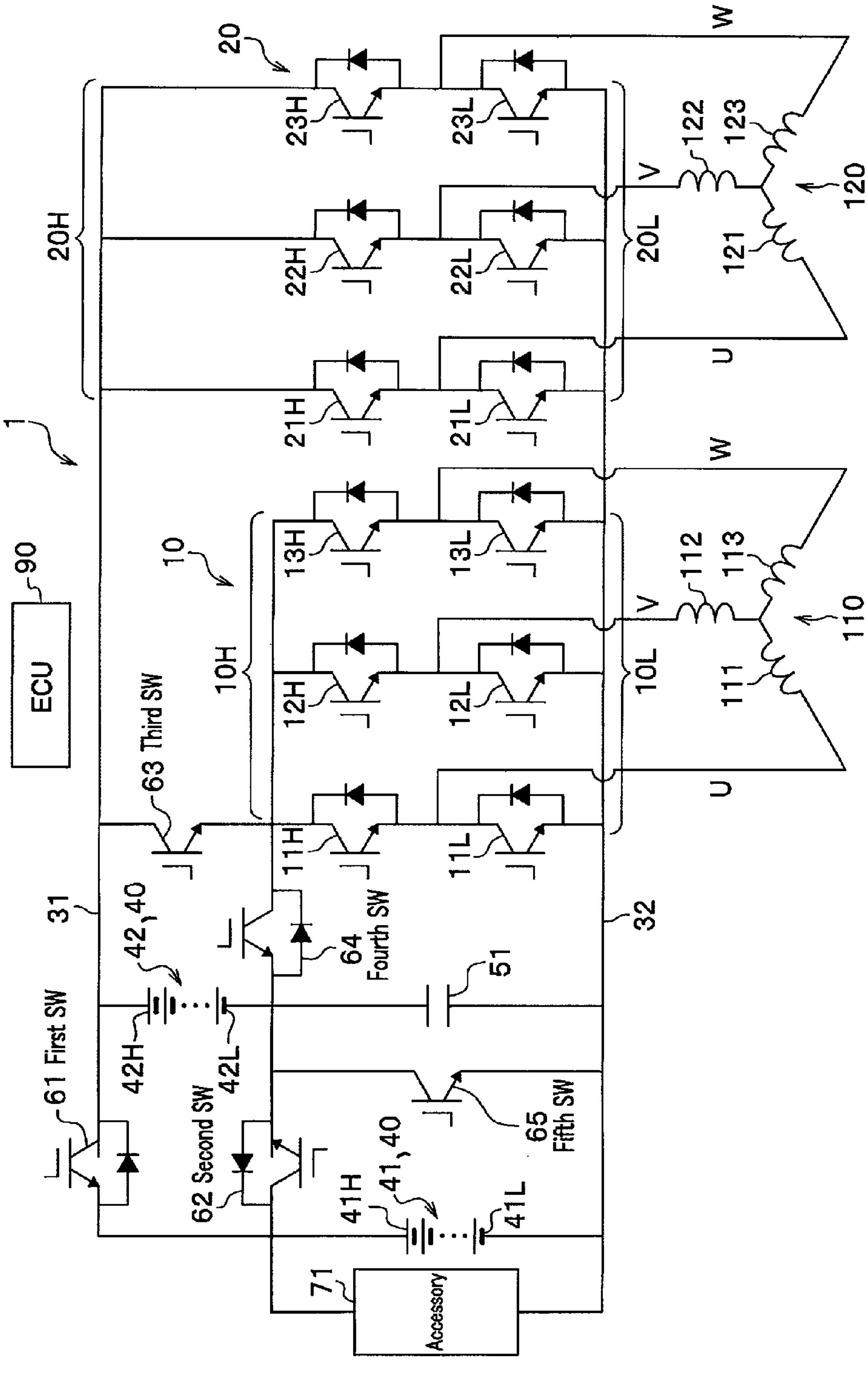
FIG. 1 is a structural drawing of a power source device according to an embodiment.
Figures 2A, 2B, 2C, 2D, 2E, 2F, 2G, 2H, 2I, 2J:
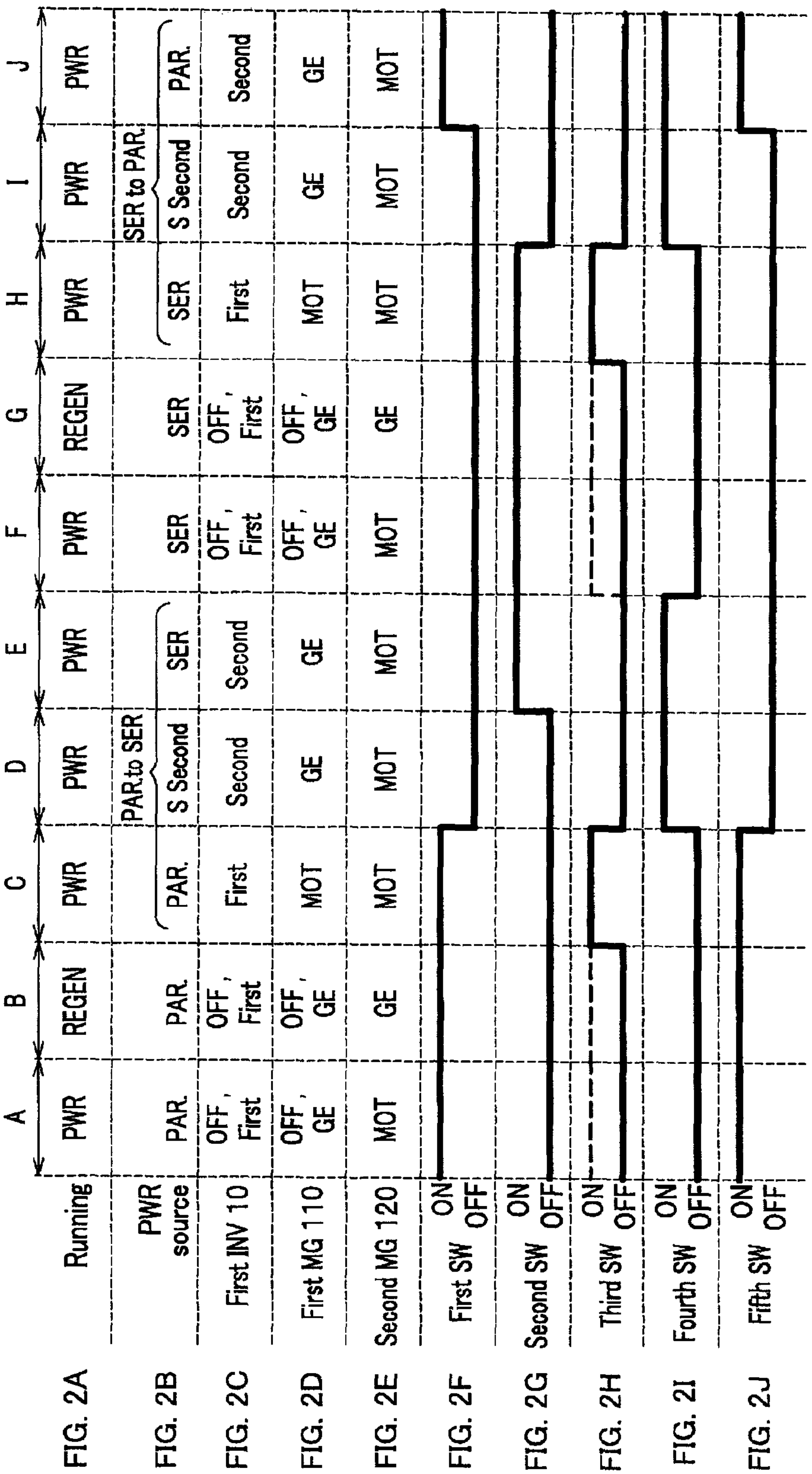
FIGS. 2A to 2J are time charts showing an operation example of the power source device according to the embodiment.
Figure 3:
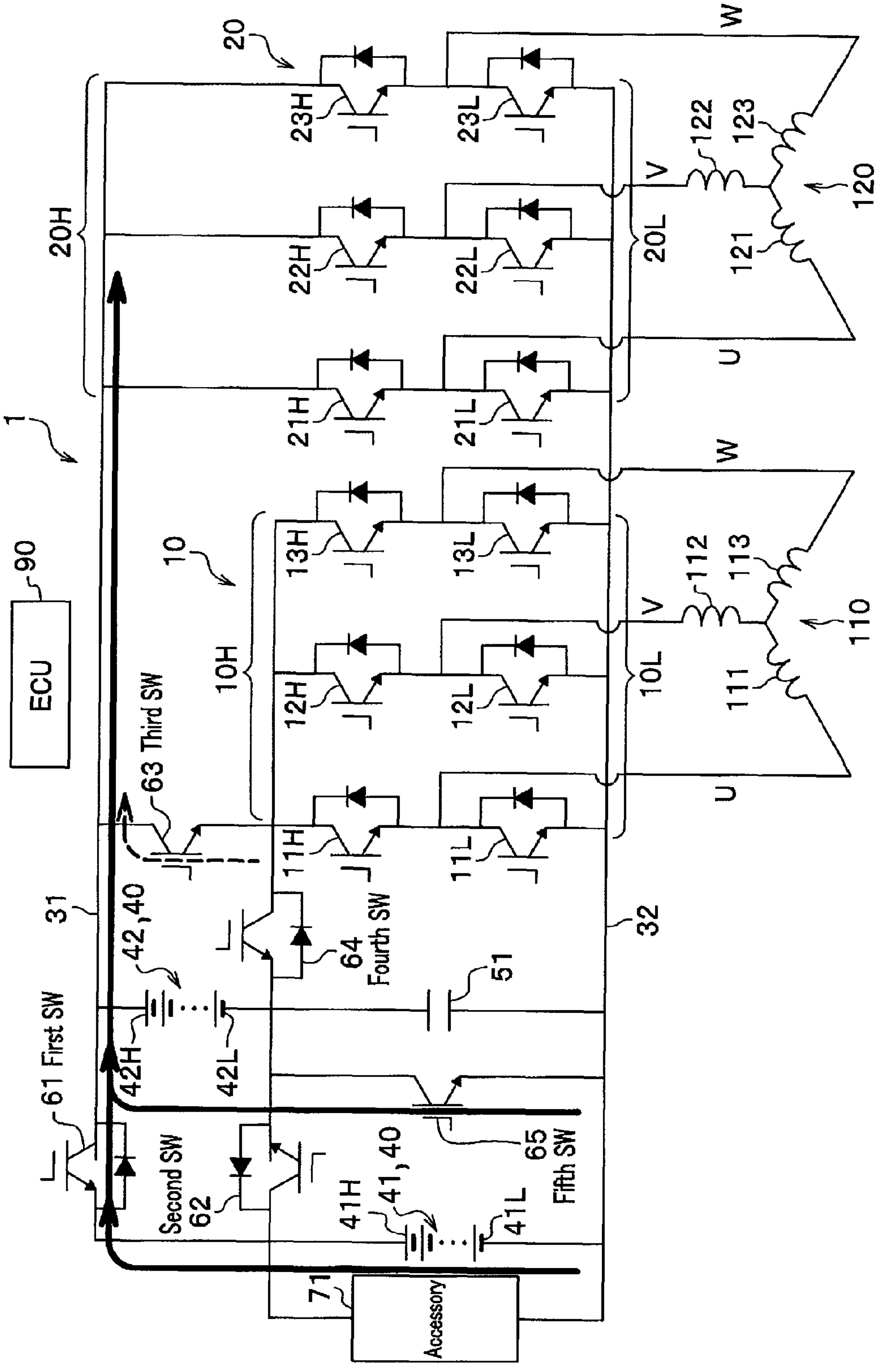
FIG. 3 is a drawing for explaining flow of currents in a section A in FIGS. 2A to 2J.

Hereinafter, an embodiment of the present invention is described with reference now to FIGS. 1 to 12.

A power source device 1 according to the present embodiment is mounted on a hybrid vehicle (electric vehicle) having a series method (not shown) and a device for transmitting and receiving a power between a first motor generator 110 and a second motor generator 120. The first motor generator 110 is connected to a not-shown internal combustion engine (drove power source) transmitting and receiving power between the first motor generator 110 and the internal combustion engine. The second motor generator 120 is connected to drive wheels (not shown) and transmits and receives power with the drive wheels.

<First Motor Generator>

The first motor generator 110 has functions of a motor (electric motor) and a generator (dynamo). More specifically, the first motor generator 110 mainly functions as a generator using power from the internal combustion engine because the first motor generator 110 is disposed on a side of the internal combustion engine and also temporarily function as a motor when connection is switched between the parallel connection of the power sources and the series connection of the power sources.

The first motor generator 110 includes a first rotor having a circular column rotating integrally with a crank shaft (output shaft) of the internal combustion engine, a first stator having a hollow circular cylindrical shape enclosing the first rotor. The first stator includes a first stator body having a hollow circular cylindrical shape and first stator coils 111, 112, and 113 mounted on first teeth of the first stator body. A first stator coils 111, 112, 113 are coils corresponding to U phase, V phase, and W phase. In addition, the first rotor having a circular cylindrical shape may be rotated through a connecting device (disconnecting device) such as a clutch, etc. with the crank shaft of the internal combustion engine.

<Internal Combustion Engine>

The internal combustion engine is, for example, of a reciprocating type and a power generating device for generating power (rotation force) by rotating the crank shaft by combustion of a fuel. The internal combustion engine includes a suction valve for sucking a mixture gas of the fuel gas and the air and the air discharging valve for discharging discharging gas after combustion, an injector for injecting a mixture gas of the fuel and the air, a throttle valve for controlling a flow rate of the air to be sucked, and an ignition plug for igniting the mixture gas. An ECU 90 appropriately controls the suction valve, the discharging valve, the injector, the throttle valve, and the ignition plug to control the output of the internal combustion engine (a rotation speed and a torque of the crank shaft).

<Second Motor Generator>

The second motor generator 120 has functions of the motor (electric motor) and the generator (dynamo). More specifically, the second motor generator 120, functioning as a motor upon power running (1), generates a drive force by consuming AC power (three-phase AC power) from the second inverter 20 and generates AC power by rotation forces of wheels, in which the second motor generator 120 functions as a generator upon regeneration (2).

The second motor generator 120 includes a second rotor having a circular column shape rotating integrally with the drive wheel and a second stator having a hollow circular cylindrical shape enclosing the second rotor. The second stator includes a second stator body having a circular cylindrical shape, second stator coils 121, 122, 123 mounted on the second teeth of the second stator body. The stator coils 121, 122, 123 are coils corresponding to U phase, V phase, and W phase.

<<Structure of the Power Source Device>>

The power source device 1 includes a first inverter 10 on the side of the internal combustion engine, the second inverter 20 on the side of the drive wheel, a positive bus bar 31 and a negative bus bar 32, a power source body 40, a capacitor 51, a first switch 61 to a fifth switch 65, a accessory 71, and the ECU 90.

<First Inverter>

The first inverter 10 is a device for transferring and receiving the power with the first motor generator 110 on a side of the internal combustion engine. The first inverter 10, more specifically, mainly has a function for, upon power generation (1) (including inertial rotation of the first rotor) converting the AC power from the first motor generator 110 into a DC power and outputting the DC power to the power source body 40 or the second inverter 20.

In addition to this, the first inverter 10 has a function of temporarily operating the first motor generator 110 as a motor by converting a DC power from a first secondary battery 41, etc. into an AC power and applies the AC power to the first motor generator 110.

The first inverter 10 includes a first inverter positive terminal 10H (high voltage side terminal) and a first inverter negative terminal 10L (low voltage side terminal).

The first inverter 10 includes a switch 11H (a transistor such as IGBT (Insulated Gate Bipolar Transistor)) and a switch 11L for U phase, a switch 12H and the switch 12L for V phase, and a switch 13H and a switch 13L for W phase. Further, each of the switches 11H is provided with a diode in parallel to thereto, the diode allowing conduction from the negative side to the positive side.

Regarding the U phase, a collector of the switch 11H is connected to the first inverter positive terminal 10H, an emitter of the switch 11H is connected to a collector of the switch 11L, an emitter of the switch 11L is connected to the first inverter negative terminal 10L. The emitter of the switch 11H and the collector of the switch 11L are connected to the first stator coil 111 corresponding to the U phase.

Because V phase and W phase have connection statuses which are the same as that of the U phase, a detailed description is omitted.

ON/OFF control of the switches 11H to 13L by the ECU 90 causes the first inverter 10 to provide conversion between the DC power and the AC power.

<Second Inverter>

The second inverter 20 is a device for applying and receiving power with the second motor generator 120 on the side of the drive wheels. More specifically, the second inverter 20 includes functions of:

(1) upon power running, converting the DC power from the first secondary battery 41, a second secondary battery 42, and the first motor generator 110 into the AC power and applying the AC power and outputs to the second motor generator 120; and (2) upon regenerating, converting a regeneration power (AC power) from the second motor generator 120 into the DC power and applying the DC power to the first secondary battery 41, etc.

The second inverter 20 includes a second inverter positive terminal 20H (high voltage side terminal) and a second inverter negative terminal 20L (low voltage side terminal).

The second inverter 20 includes a switch 21H and a switch 21L for the U phase, a switch a switch 22H and a switch 22L for the V phase, and a switch 23H and a switch 23L for the W phase. Further, each of the switches 21H, etc. is provided with a diode in parallel to thereto, the diode allowing conduction from the negative side to the positive side.

Because the connection statuses of the switch 21H, etc. in the second inverter 20 are the same as that of the first inverter 10, a detailed description is omitted.

<Positive Bus Bar, Negative Bus Bar>

The positive bus bar 31 is a bus bar on the positive terminal side of the power source device 1 and connected to the second inverter positive terminal 20H and a collector of a third switch 63. Further, an emitter of the third switch 63 is connected to the first inverter positive terminal 10H. The negative bus bar 32 is a bus bar on the negative side of the power source device 1 and connected to the first inverter negative terminal 10L and the inverter negative terminal 20L.

<Power Source Body (First Secondary Battery, Second Secondary Battery)>

The power source body 40 includes the first secondary battery 41 (first power source) and the second secondary battery 42 (second power source). The first secondary battery 41 and the second secondary battery 42, being high voltage power sources, are battery packs each including a plurality of single cells connected in series. The first secondary battery 41 and the second secondary battery 42 are secondary batteries capable of being charged with a DC power and discharging a DC power (charge/discharge) and has a configuration of, for example, a lithium ion type, a Lithium ion polymer type, or a nickel metal hydride type.

The first secondary battery 41 includes a first power source positive terminal 41H, and a first power source negative terminal 41L. The first power source positive terminal 41H is electrically connected to the positive bus bar 31 through the first switch 61. The first power source negative terminal 41L is connected to the negative bus bar 32.

The second secondary battery 42 includes a second power source positive terminal 42H and a second power source negative terminal 42L. The second power source positive terminal 42H is connected to the positive bus bar 31. The second power source negative terminal 42L is connected to the negative bus bar 32 through the fifth switch 65.

<Capacitor>

The capacitor 51 is a device for being charged with and discharging electric charges. The capacitor 51 is connected in parallel to the fifth switch 65, and a positive terminal of the capacitor 51 is connected to the second power source negative terminal 42L, and a negative terminal of the capacitor 51 is electrically connected to the negative bus bar 32.

<Switch>

The first switch 61 to the fifth switch 65 are switches controlled by the ECU 90 between ON (conduction) and OFF (non-conduction) and configured with, for example, IGBT.

The first switch 61 is a switch for making the connection state between the first power source positive terminal 41H and the positive bus bar 31 ON/OFF.

A second switch 62 is a switch for making the connection state between the first power source positive terminal 41H and the first power source negative terminal 41L ON/OFF.

The third switch 63 is a switch for making the connection state between the positive bus bar 31 and the first inverter positive terminal 10H ON/OFF.

A fourth switch 64 is a switch for making the connection state between the second power source negative terminal 42L and the first inverter positive terminal 10H ON/OFF.

The fifth switch 65 is a switch for making the connection state between the second power source negative terminal 42L and the negative bus bar 32 ON/OFF.

<Accessories>

The accessory 71 is a device operable at a voltage lower than that of the second motor generator 120 (for example, at 12V) which is, for example, a headlight, a room lamp, a navigation device. The accessory 71 is connected to the first secondary battery 41, and a DC-DC converter (not shown)

for bucking the voltage is provided between the accessory 71 and the first secondary battery 41.

<ECU>

The ECU 90 is a control device for electronically controlling the power source device 1 including a CPU, a ROM, a RAM, various types of interfaces, and electronic circuits, etc.

The ECU 90 is configured to perform various processes in accordance with a program stored therein.

<Powering/Regenerating Determination in ECU>

The ECU 90 has a function of determining whether the status is in powering or not on the basis of the vehicle speed and an accelerator opening degree.

The accelerator opening degree is detected through accelerator opening degree sensor (not shown), and the vehicle speed sensor (not shown). The ECU 90 is configured to determine that the status is powering when the vehicle speed and/or the accelerator opening degree increases for an immediately before predetermined unit interval. On the other hand, the ECU 90 is configured to determine that the status is not in powering when the vehicle speed and/or the accelerator opening degree decreases.

<Connection Status of First Secondary Battery, Etc.>

Next, a connection status of the first secondary battery 41, the second secondary battery 42, and the first inverter 10 on the side of the internal combustion engine is described. Further, the ECU 90 is configured to appropriately switch the connection status described later by appropriately turns the first switch 61, etc. ON/OFF.

<Parallel Connection Status of Power Sources>

When the first switch 61 and the fifth switch 65 are ON state, and the second switch 62 is in OFF state, the connection status enters a parallel connection status of the power sources in which the first secondary battery 41 and the second secondary battery 42 are connected in parallel relative to the load (the second inverter 20).

<Power Source Serial Connection Status>

When the second switch 62 is in an ON state, and the first switch 61 and the fifth switch 65 are in OFF states, the first secondary battery 41 and the second secondary battery 42 enter the power source serial connection status in which the first secondary battery 41 and the second secondary battery 42 are connected in series relative to the load (the second inverter 20).

<Selection Between the Power Source Parallel Connection Status and the Power Source Serial Connection Status>

The ECU 90 includes a function of selecting either of the power source parallel connection status or the power source serial connection status on the base of the requested torque, the vehicle speed, and a connection state map to have the selected connection status by controlling the first switch 61, etc. between ON/OFF.

The connection status map is obtained by a previous test, etc. and previously stored in the ECU 90 and divided into a region of selecting the power source parallel connection status and a region of selecting the power source serial connection status according to the required torque and the vehicle speed. More specifically, mapping is made such that with an increase in the requested torque and/or the vehicle speed, the power source serial connection is more easily selected.

<Single Second Power Source Status>

When the first switch 61 and the second switch 62 are in OFF states, the connection status enters a single second power source status in which only the second secondary battery 42 is outputting. Further, in this embodiment, the fifth switch 65 also comes in an OFF state in the single second power source status.

<Power Source Connection Status Switching Means>

Accordingly, in the embodiment, the power source status switching means for making switching among the power source parallel connection status, the power source serial connection status, and single second power source status is configured including the first switch 61, the second switch 62, the fourth switch 64, the fifth switch 65, and the ECU 90 controlling these switches.

<First Inverter: First Connection Status>

In a case where the power source body 40 is in the power source parallel connection status or the power source serial connection status, when the third switch 63 is in an ON state, and the fourth switch 64 is an OFF state, the first inverter 10 enters the first connection status. In the first connection status, it becomes possible that (1) the power of the power source body 40 is supplied to the first inverter 10 to cause the first motor generator 110 to function as a motor and (2) the power of the first motor generator 110 functioning as a generator is supplied to the power source body 40 and/or the second inverter 20.

<First Inverter: Second Connection Status>

In the case where the power source body 40 is in the single second power source status, when the third switch 63 is in the OFF state and the fourth switch 64 is in an ON state, the first inverter 10 is in the second connection status.

<Inverter Connection State Switching Means>

Accordingly, in the embodiment, the inverter connection status switching means is configured including the third switch 63, the fourth switch 64, and the ECU 90 controlling them.

<<Operation of the Power Source Device>>

Hereinafter, operation of the power source device 1 is described.

<Power Source Body: In Power Source Parallel Connection Status-In Powering>

As shown in FIGS. 2A to 2J (section A) and 3, when the ECU 90 selects the power source parallel connection status, the ECU 90 turns on the first switch 61 and the fifth switch 65, and turns off the second switch 62, the third switch 63, and the fourth switch 64. Accordingly, the first secondary battery 41 and the second secondary battery 42 are made to have a power source parallel connection status.

When the ECU 90 determining that the running status is powering, the ECU 90 controls the second inverter 20 to cause the second motor generator 120 to function as a motor to convert the DC power from the first secondary battery 41 and the second secondary battery 42 into an AC power to supply the AC power to the second motor generator 120. More specifically, the ECU 90 performs PWM control for the second inverter 20 to equalize the actual torque in the second motor generator 120 to the requested torque.

In this case, when it is determined that the DC power only from the first secondary battery 41 and the second secondary battery 42 will become insufficient, the ECU 90 may be configured as follows:

The ECU 90 turns on the third switch 63 and operates the internal combustion engine to cause the first motor generator 110 to function as a generator, and the AC power from the first motor generator 110 is converted into a DC power with the first inverter 10 to supply the DC power to the second inverter 20.

<Power Source Body: In Power Source Parallel Connection Status-In Regenerating>

Figure 4:
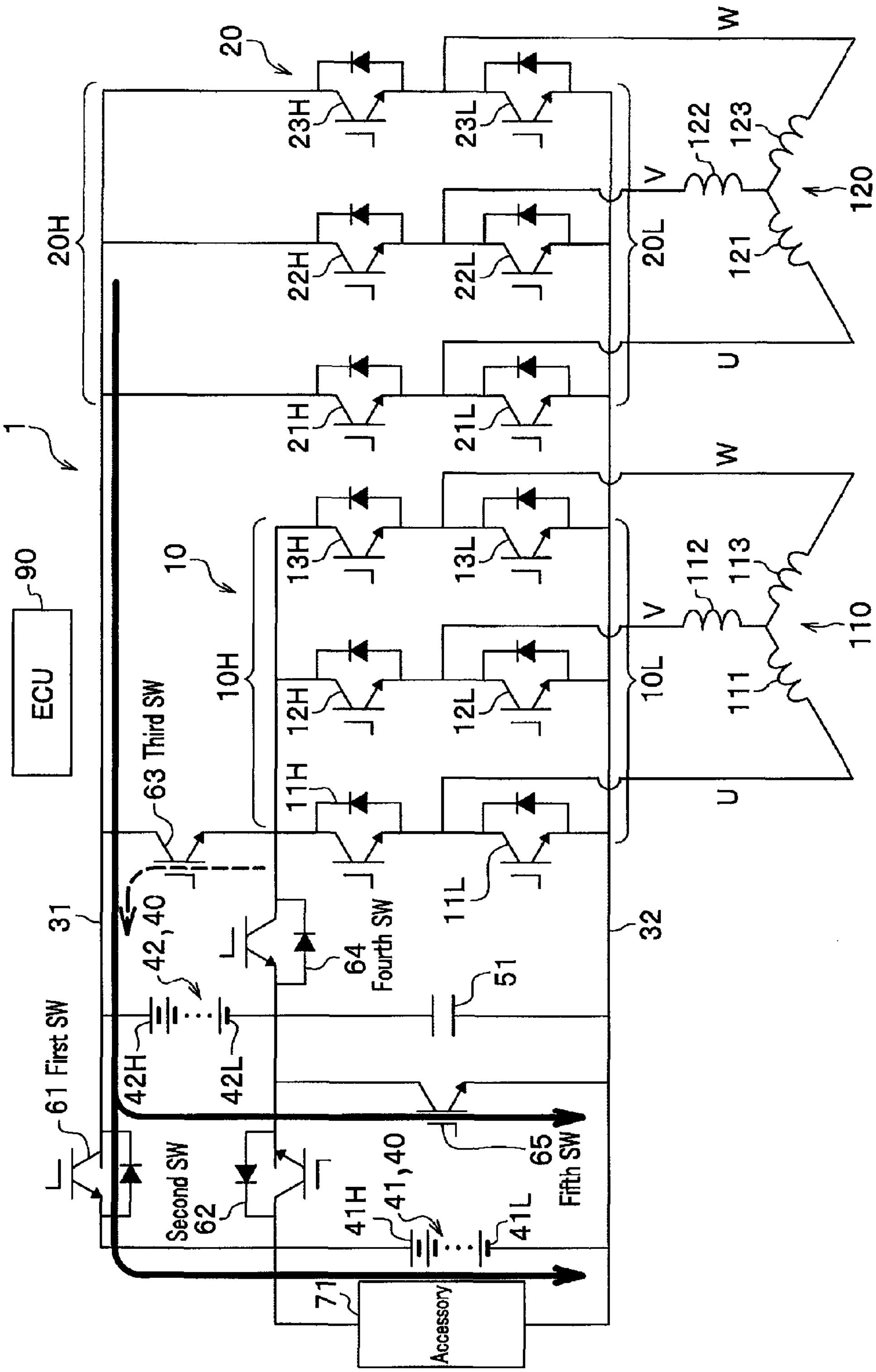
FIG. 4 is a drawing for explaining flow of currents in a section B in FIGS. 2A to 2J.

As shown in FIGS. 2A to 2J (section B) and FIG. 4, when the ECU 90 determines that the connection state is selected as the power source parallel connection status, and the drive state is in regeneration, the ECU 90 controls the second inverter 20 so that the AC power from the second motor generator 120 functioning as a generator is converted into a DC power. Accordingly, the DC power just after the conversion is charged in the first secondary battery 41 and the second secondary battery 42.

In this case, when it is determined that the first secondary battery 41 and the second secondary battery 42 cannot be sufficiently charged only with the DC power from the second inverter 20, or when the first secondary battery 41 and the second secondary battery 42 cannot be sufficiently charged, the ECU 90 may be configured to cause the first motor generator 110 to function as a generator and the AC power from the motor generator 110 is converted into DC power by the first inverter 10 so that also the DC power is charged into the first secondary battery 41 and the second secondary battery 42.

<Power Source Body: Power Source Parallel Connection Status—Regenerating>

Figure 5:
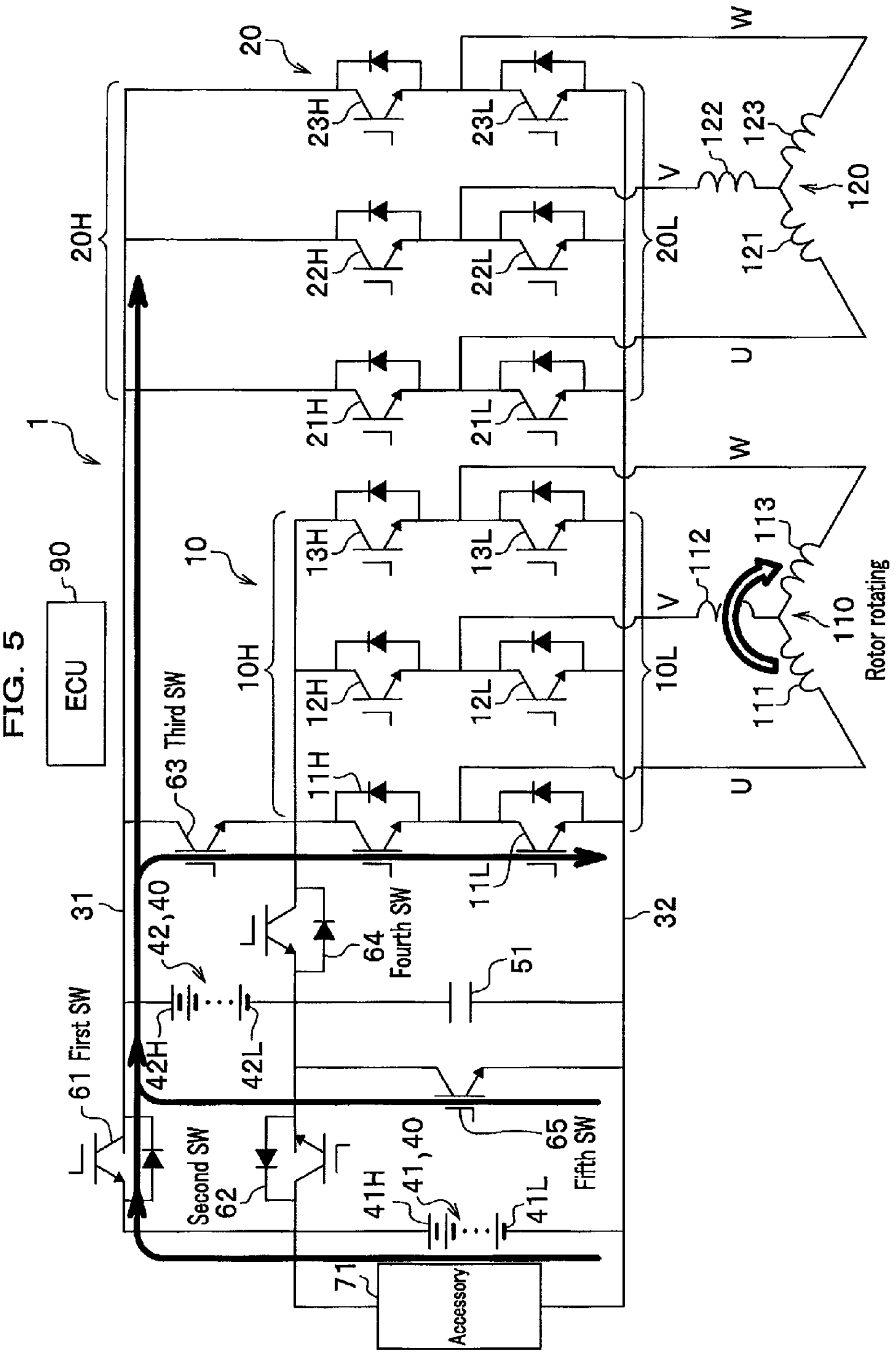
FIG. 5 is a drawing for explaining flow of currents in a section C in FIGS. 2A to 2J.
Figure 6:
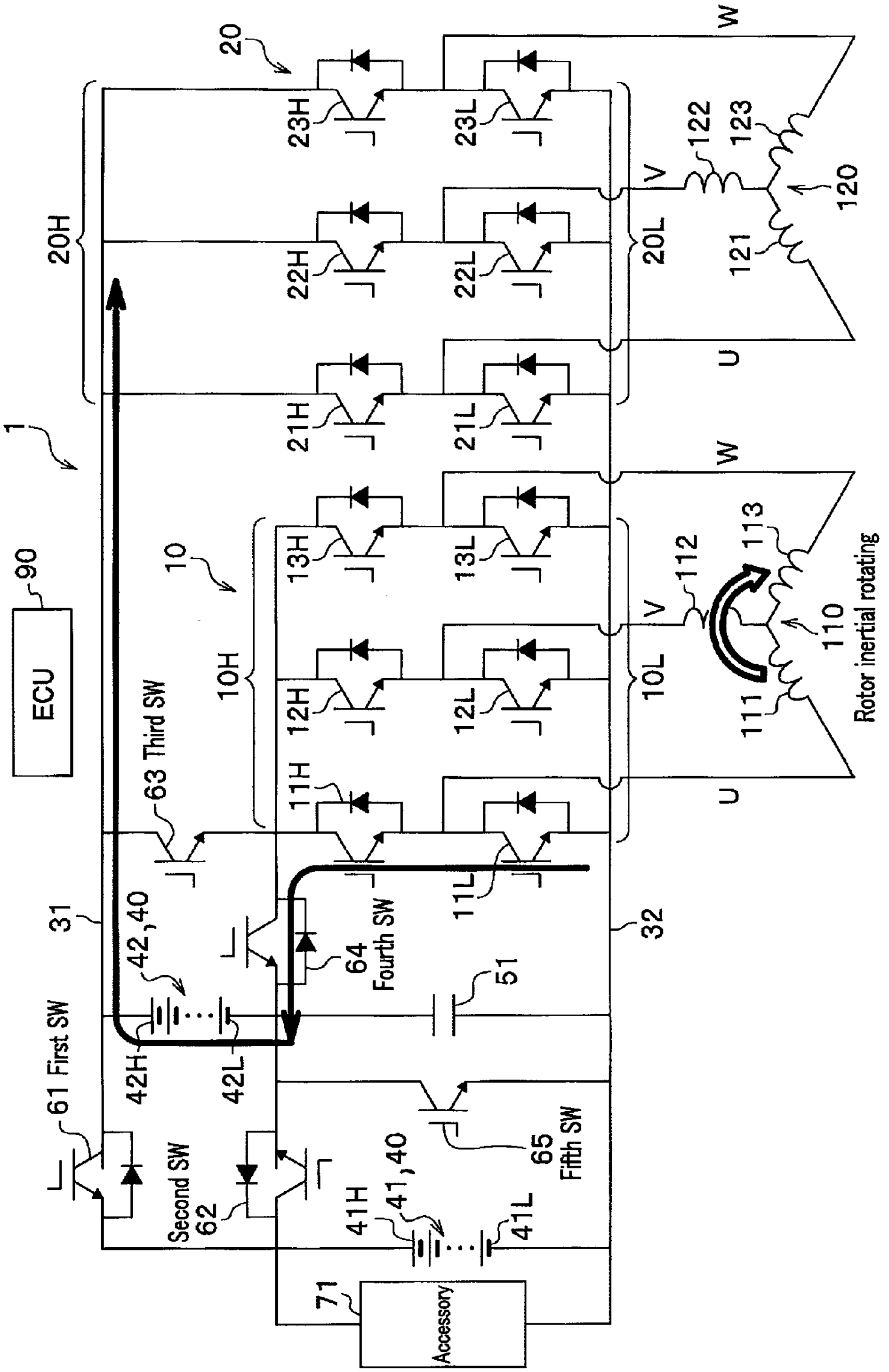
FIG. 6 is a drawing for explaining flow of currents in a section D in FIGS. 2A to 2J.
Figure 7:
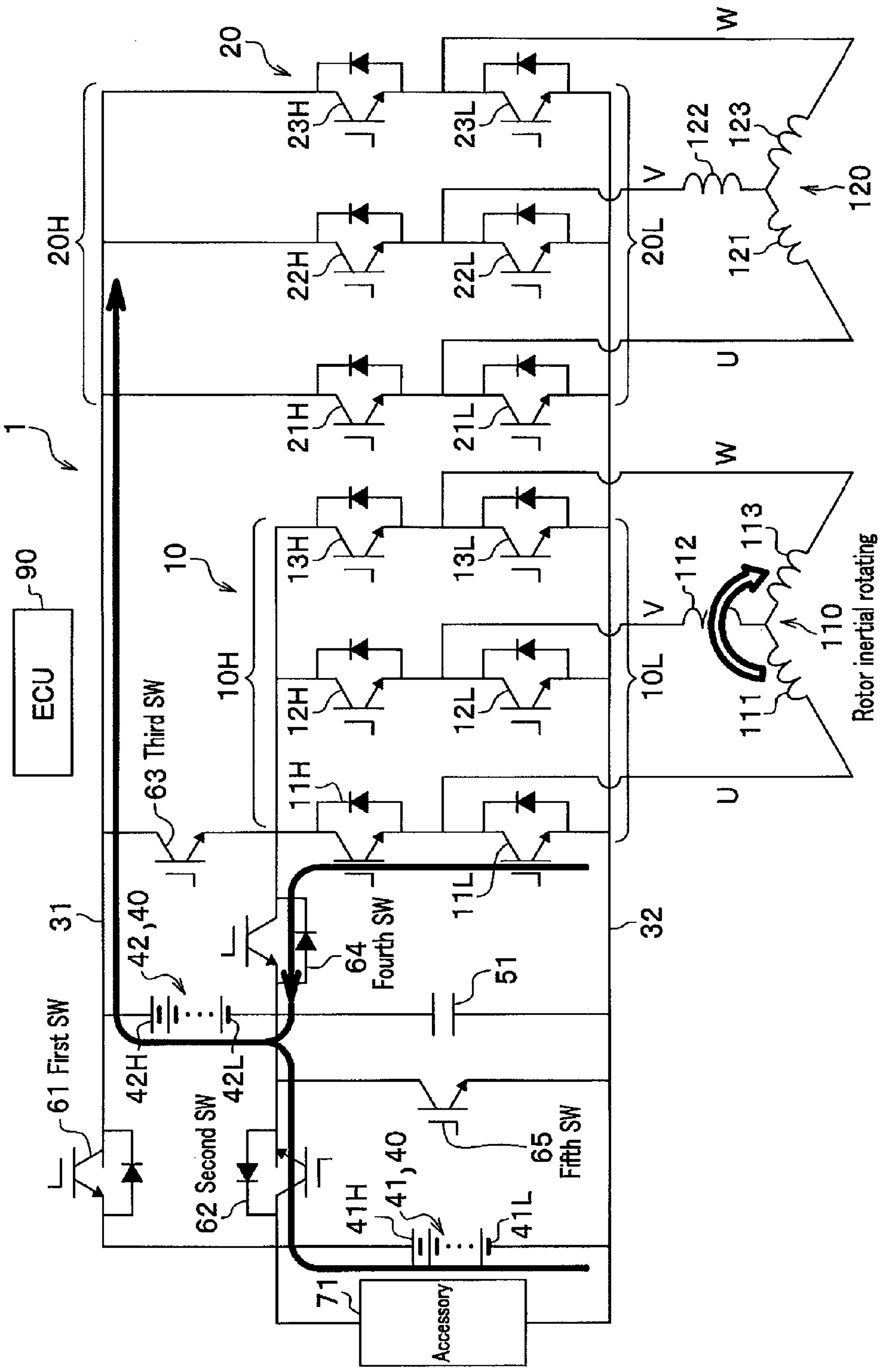
FIG. 7 is a drawing for explaining flow of currents in a section E in FIGS. 2A to 2J.

Next, with reference now to FIGS. 2A to 2J (sections C to E) and FIGS. 5 to 7, a case where a connection status is changed from the power source parallel connection status to the power source serial connection status, is described.

<First Inverter: In First Connection Status>

As shown in FIGS. 2A to 2J (section C) and FIG. 5, the ECU 90 turns on the third switch 63 while the first switch 61 and the fifth switch 65 are kept ON. Further the second switch 62 and the fourth switch 64 are kept OFF. As a result of this operation, the power source body 40 and the first inverter 10 are in the power source parallel connection status enters a first connection status.

<First Motor Generator: a Motor>

Next, the ECU 90 controls the first inverter 10 to convert the DC power from the first secondary battery 41 and the second secondary battery 42 into the AC power to supply the AC power to the first motor generator 110 to cause the first motor generator 110 to function as a motor. As a result, a first rotor (not shown) of the first motor generator 110 rotates.

In this case, because the rotating first rotor drags a crank shaft of the internal combustion engine, a configuration may be provided in which a clutch mechanism is provided between the first rotor and the crank shaft and when the first rotor is rotated, the clutch mechanism is made OFF (disconnecting power). The same is applied to the case where the power source serial status is changed into the power source parallel status as described later.

Further, an electromotive force generated in the first rotor rotating by inertia after that in accordance with a degree of rotation of the first rotor. More specifically, as the first rotor is rotated at a higher speed, the electromotive force becomes large. Accordingly, it is preferable to, for example, increase a supply amount of the power to the first motor generator 110 so as to rotate the first rotor at a high speed with an increase in the terminal voltage of the first secondary battery 41 to make the electromotive force generated after that becomes higher than the terminal voltage of the first secondary battery 41. The terminal voltage of the first secondary battery 41 is detected by the voltage sensor, etc.

<Power Source Body is in a Single Second Power Source Status, and the First Inverter is in a Second Connection Status>

Next, as shown in FIGS. 2A to 2J (section D) and FIG. 6, the ECU 90 turns on the fourth switch 64 and turns off the first switch 61, the second switch 62, the third switch 63, and the fifth switch 65. As a result, the power source body 40 enters a single second power source status in which only the second secondary battery 42 outputs (with connection to an external part). The first inverter 10 enters a second connection status (serial connection status) in which the first inverter 10 is connected in series to the power source body 40, being in a single second power source status.

Further, the third switch 63 is turned off, which stops power supply from the power source body 40 to the first inverter 10, so that the first motor generator 110 loses the motor function. However, the first rotor has inertial rotation by inertia (inertia) of the first rotor itself, so that the first motor generator 110 operates as a generator (displaying the generator function); so that an AC power is generated at the first stator coils 111 to 113.

Next, the ECU 90 controls the first inverter 10 to convert the AC power from the first motor generator 110 operating as the generator into a DC power. As a result, the first inverter 10 temporarily operates as a DC power supply (booster) and the first inverter 10 enters a serial connection status with the second secondary battery 42 (second connection status).

Further, in the serial connection status, the first inverter 10 is connected in parallel to the capacitor 51 and is in parallel also to the first secondary battery 41 to be connected after that.

In this state, a rotation speed of the first rotor becomes gradually small, so that the electromotive force of the first inverter 10, which temporarily operates as a power source, also becomes gradually small. On the other hand, because in the capacitor 51, charges are being stored, the voltage of the capacitor 51 becomes gradually large.

<Power Source Body is in Power Source Serially Connected Status>

Next, as shown in FIGS. 2A to 2J (section E) and FIG. 7, the ECU 90 turns on the second switch 62 while the fourth switch 64 is kept ON. Further, the first switch 61, the third switch 63, and the fifth switch 65 are kept OFF.

Accordingly, the power source body 40 changes from the single second power source status to the power source serial connection status in which the first secondary battery 41 and the second secondary battery 42 are connected in series. After that, the ECU 90 turns off the fourth switch 64.

As described above, via a serial connection status in which the second secondary battery 42, the first inverter 10 and the capacitor 51, being temporarily a power source, are connected in series, connection is changed into the power source serial connection status in which the first secondary battery 41 and the second secondary battery 42 are connected in series. Accordingly, this makes rapid variation in the applied voltage to the second inverter 20 smaller than that by configuration in which the power source parallel connection status is changed to the power source serial connection status in which the first secondary battery 41 and the second secondary battery 42 are in series without via the serial connection status.

Further, it is preferable that timing at which the single second power source status is switched to the power source serial connection status is timing at which the first power source voltage (terminal voltage) of the first secondary battery 41, the electromotive force of the first inverter 10, and the voltage of the capacitor 51 are substantially the same. Accordingly, the configuration may include a voltage sensor for detecting the first power source voltage of the first secondary battery 41, a voltage sensor for detecting the voltage of the capacitor 51, and a voltage sensor for detecting the electromotive force of the first inverter 10.

<Power Source Body: In a Power Source Serial Connection Status-In Powering>

Figure 8:
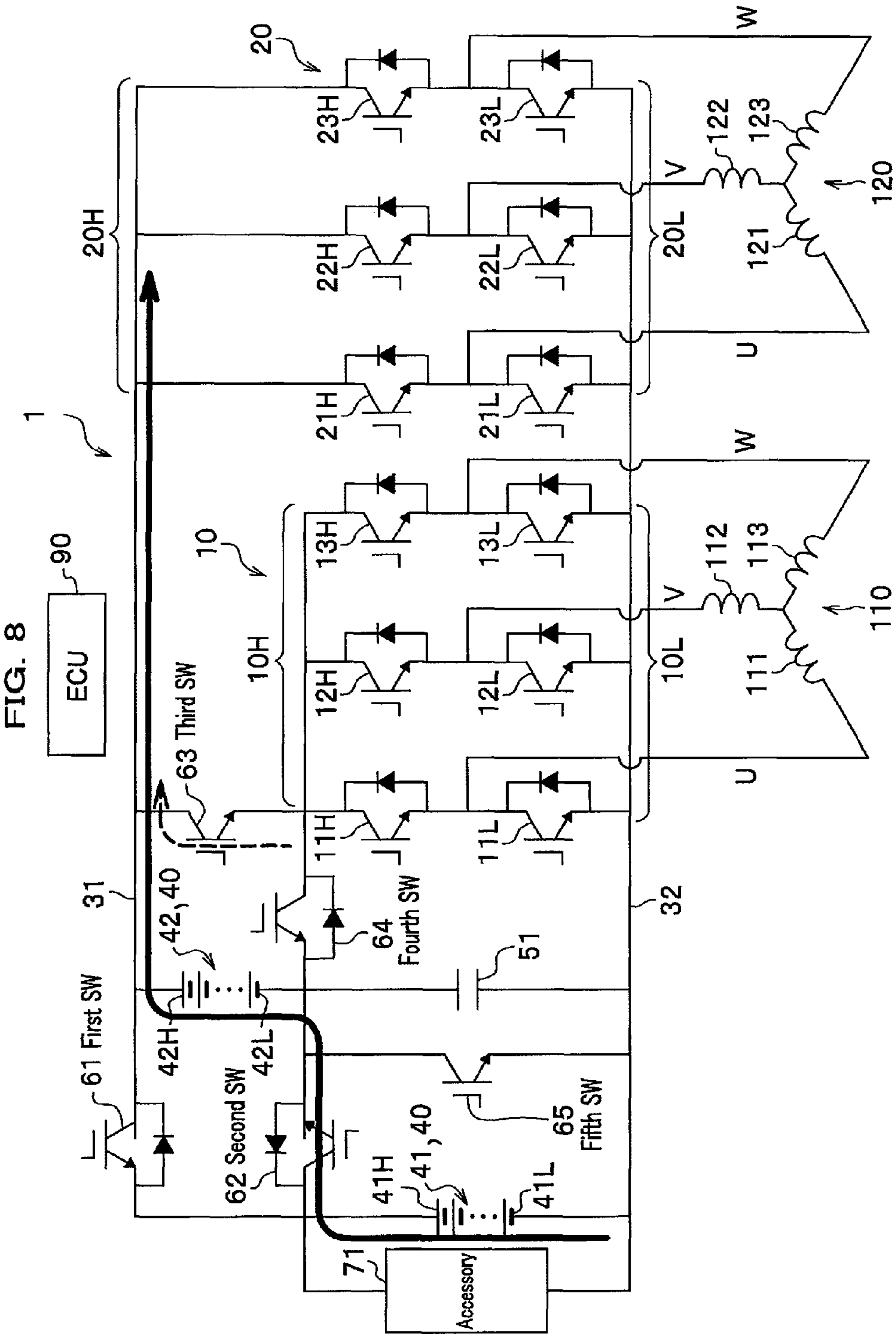
FIG. 8 is a drawing for explaining flow of currents in a section F in FIGS. 2A to 2J.

As shown in FIGS. 2A to 2J (section F) and FIG. 8, when being selecting the power source serial connection status, the ECU 90 turns on the second switch 62 and turns off the third switch 63, the fourth switch 64, and the fifth switch 65. Then, the first secondary battery 41 and the second secondary battery 42 enters the serial connection status.

When determining that it is in a powering status, the ECU 90 controls the second inverter 20 to cause the second motor generator 120 to function as a motor to convert the DC power from the first secondary battery 41 and the second secondary battery 42 into the AC power to supply the AC power to the second motor generator 120.

In this case, when it can be determined that supply from only the DC power from the first secondary battery 41 and the second secondary battery 42 becomes insufficient, the ECU 90 may be configured to turn on the third switch 63 and operate the internal combustion engine to cause the first motor generator 110 to function as a generator to convert the AC power from the first motor generator 110 into the DC power by the first inverter 10 to supply the DC power also to the second inverter 20.

<Power Source Body: In a Power Source Serial Connection Status-In Regenerating>

Figure 9:
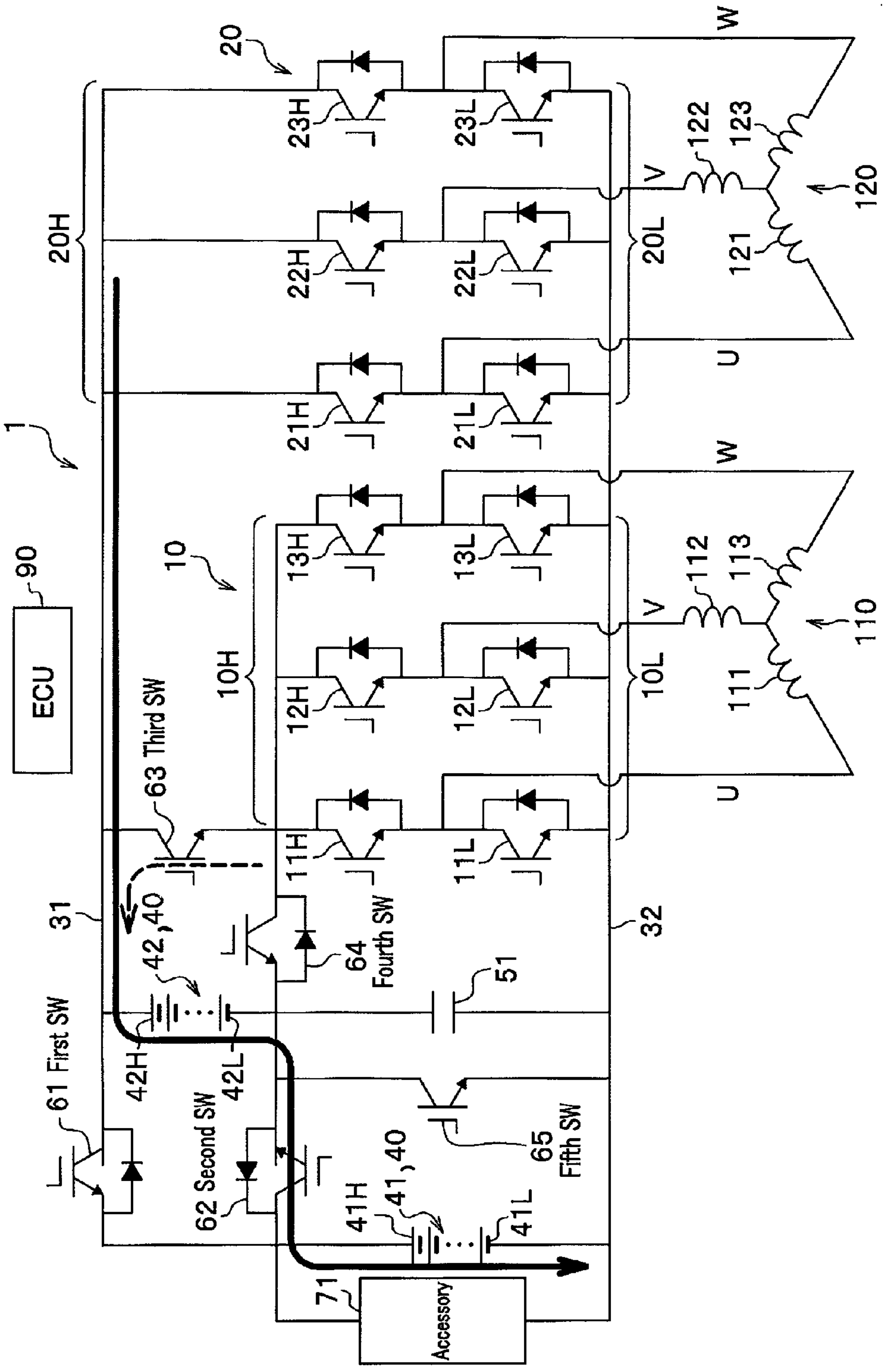
FIG. 9 is a drawing for explaining flow of currents in a section G in FIGS. 2A to 2J.

As shown in FIGS. 2A to 2J (section G) and FIG. 9, when determining that regeneration is performed in the case where the power source serial connection status is selected, the ECU 90 controls the second inverter 20 to convert the AC power from the second motor generator 120 functioning as the generator into the DC power. Then, the DC power after conversion is charged into the first secondary battery 41 and the second secondary battery 42.

In this case, when it is determined that only the DC power from the second inverter 20 cannot charge the first secondary battery 41 and the second secondary battery 42 sufficiently, or in the similar case, the ECU 90 turns on the third switch 63 and operates the internal combustion engine to cause the first motor generator 110 to function as the generator and convert the AC power from the first motor generator 110 into the DC power, and the DC power is also charged into the first secondary battery 41 and the second secondary battery 42.

<Power Source Body: Power Source Serial Connection Status to the Power Source Parallel Status>

Figure 10:
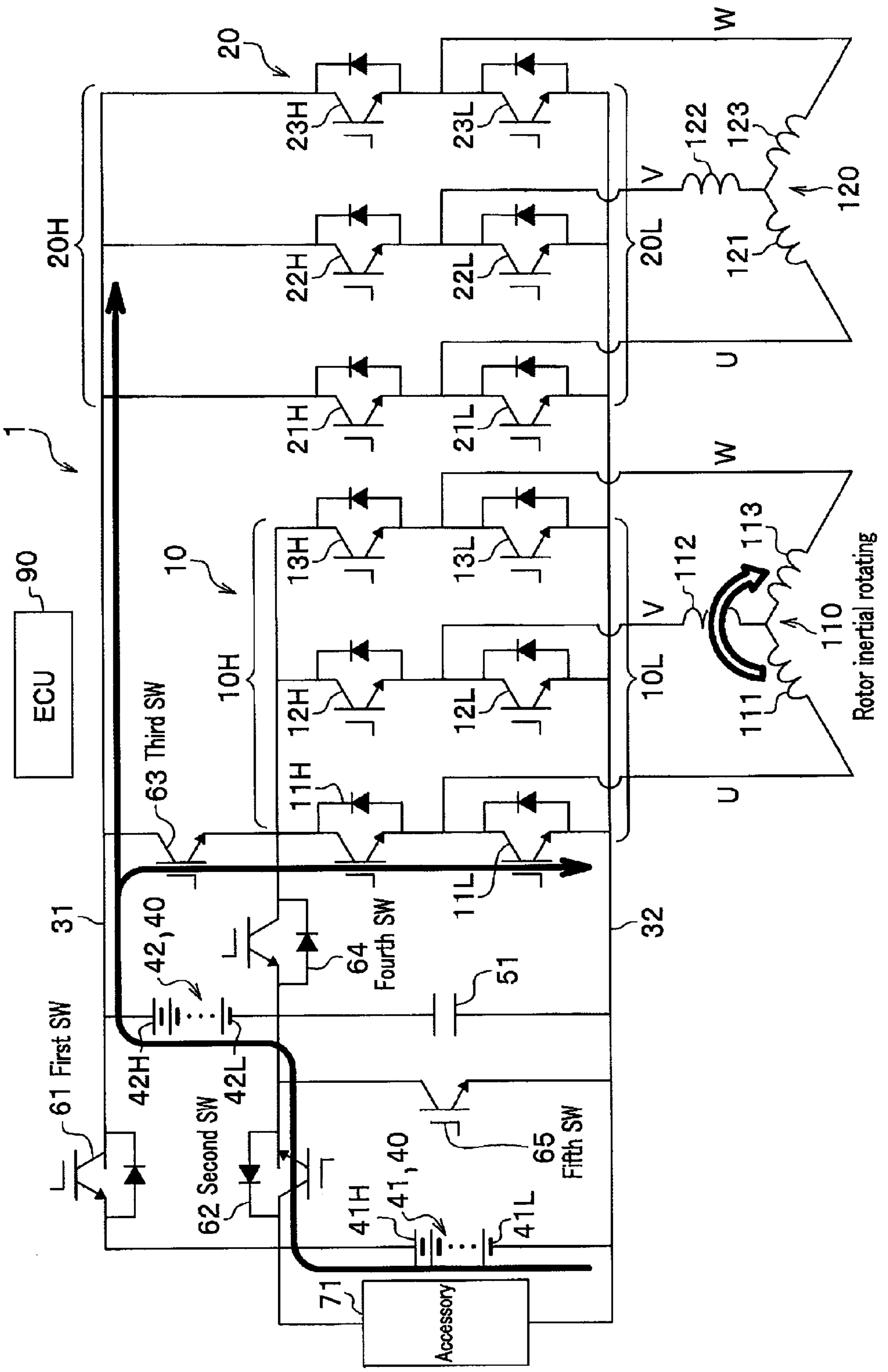
FIG. 10 is a drawing for explaining flow of currents in a section H in FIGS. 2A to 2J.
Figure 11:
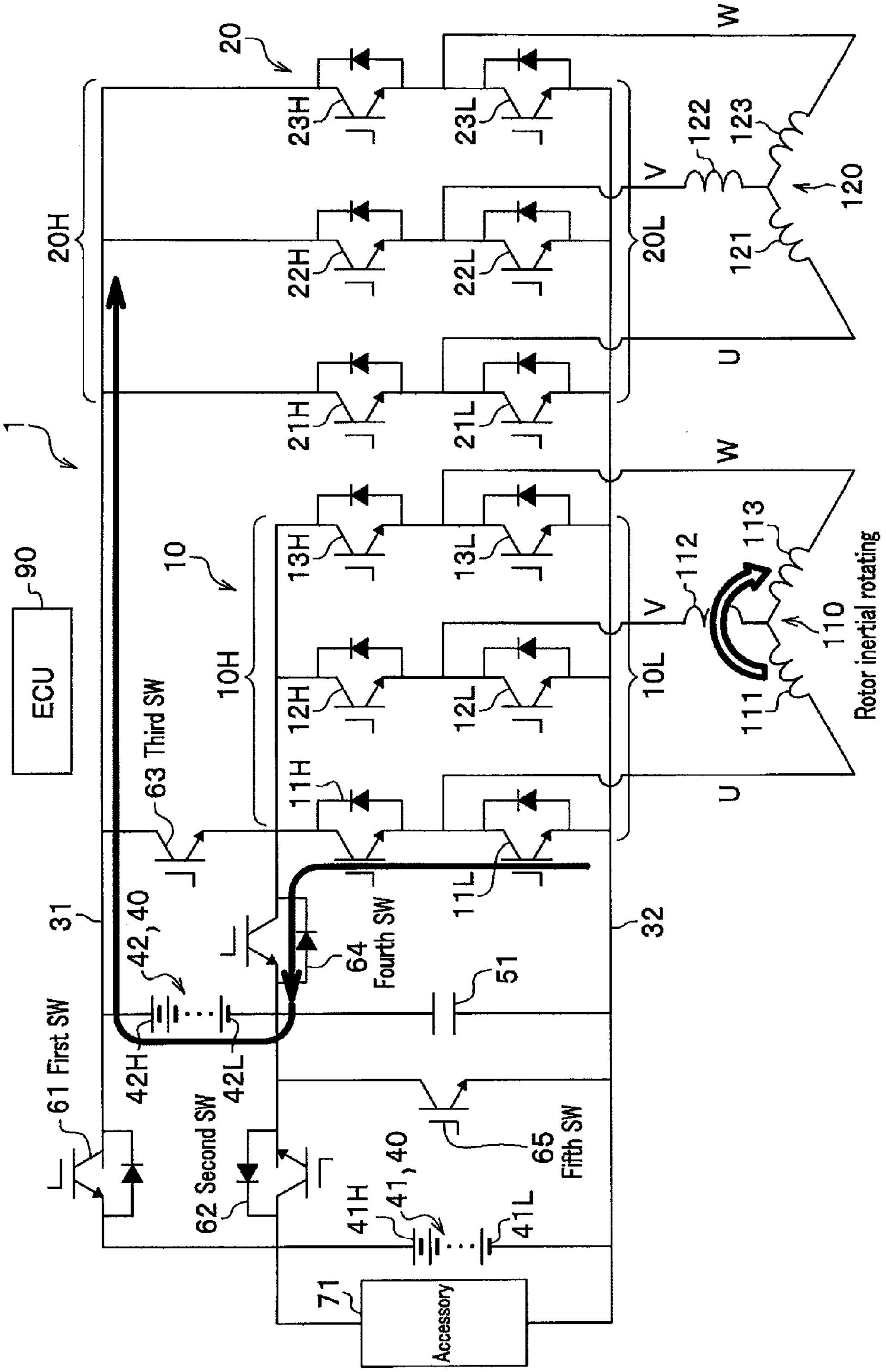
FIG. 11 is a drawing for explaining flow of currents in a section I in FIGS. 2A to 2J.

Next, with reference to FIGS. 2A to 2J (sections H to J), and FIGS. 10 to 11, the case where the power source serial connection status is switched to the power source parallel connection status is described.

<First Inverter: In a First Connection Status>

As shown in FIGS. 2A to 2J (section H) and FIG. 10, the ECU 90 turns ON also the third switch 63 while the second switch 62 is kept ON. Further, the first switch 61, the fourth switch 64, and the fifth switch 65 are kept OFF. As a result, the power source body 40, being in the power source serial connection status, and the first inverter 10 enters the first connection status.

<First Motor Generator: a Motor>

Next, the ECU 90 controls the first inverter 10 to convert the DC power from the first secondary battery 41 and the second secondary battery 42 into the AC power to supply the AC power to the first motor generator 110 to cause the first motor generator 110 to function as the motor. As a result, the first rotor (not shown) of the first motor generator 110 rotates.

<Power Source Body: In the Single Second Power Source Status, the First Inverter: In the Second Connection Status>

Next, as shown in FIGS. 2A to 2J (section I) and FIG. 11, the ECU 90 turns on the fourth switch 64 and turns off the first switch 61, the second switch 62, the third switch 63, and the fifth switch 65. As a result, the power source body 40 enters a single second power source status in which only the second secondary battery 42 outputs (connected to the external). The first inverter 10 enters the second connection status (serial connection status) in which the first inverter 10 is connected in series to the power source body 40, being in the single second power source status.

Further, because the third switch 63 is turned off, power supply from the power source body 40 to the first inverter 10 is stopped, so that the motor function of the first motor generator 110 loses. However, the first rotor rotates by inertia (inertia) of the first rotor itself and the first motor generator 110 operates as a generator (displaying a generator function), so that an AC power is generated in the first stator coils 111 to 113.

<First Inverter: in the Serial Connection Status>

Next, the ECU 90 controls the first inverter 10 to convert the AC power from the first motor generator 110 operating as the generator into a DC power. As a result, the first inverter 10 temporarily becomes a DC power source and is connected to the second secondary battery 42 in series.

Further in the serial connection status, the first inverter 10 is connected to the capacitor 51 in parallel and also in parallel to the first secondary battery 41 to be connected later.

In this status, the rotation speed of the first rotor becomes gradually low, so that the electromotive force of the first inverter 10, temporarily being a power source, also becomes gradually low. On the other hand, because charges are stored in the capacitor 51, the voltage of the capacitor 51 becomes gradually large.

<Power Source Body: In Power Source Parallel Connection Status>

Figure 12:
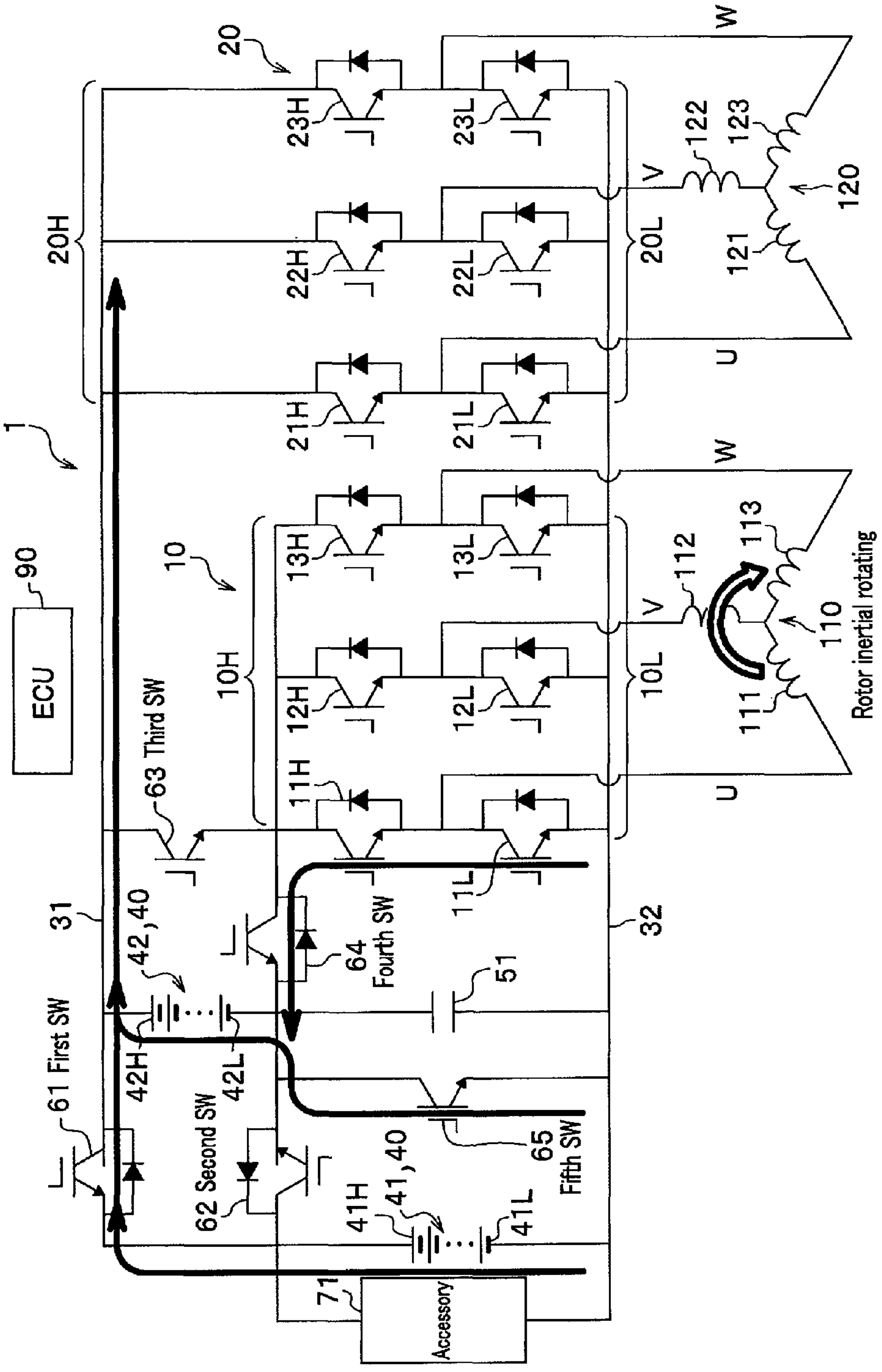
FIG. 12 is a drawing for explaining flow of currents in a section J in FIGS. 2A to 2J.

Next, as shown in FIGS. 2A to 2J (section J) and FIG. 12, the ECU 90 turns on the first switch 61 and the fifth switch 65, while the fourth switch 64 is kept on. Further, the second switch 62 and the third switch 63 are kept off.

Accordingly, the status of the power source body 40 is switched from the single second power source status to the power source parallel connection status in which the first secondary battery 41 and the second secondary battery 42 are connected in parallel. After that, the ECU 90 turns off the fourth switch 64.

As described above, via the serial connection status in which the first inverter 10, being temporarily a power source, and the capacitor 51 are connected in series, thereafter, the connection status is switched to the power source parallel connection status in which the first secondary battery 41 and the second secondary battery 42 are connected in parallel, which makes a rapid variation in the application voltage to the second inverter 20 smaller than a configuration which would change from the power source serial connection status to the power source parallel connection status without the transition of the serial connection status.

Further, it is desirable that timing when the connection status is switched from the single second power source status to the power source parallel connection status is made when the first power source voltage (terminal voltage) of the first secondary battery 41, an electromotive force of the first inverter 10, and the voltage of the capacitor 51 are substantially equal.

<<Modifications>>

As described above, an embodiment of the present invention has been described. However, the present invention is not limited to this and may be modified below.

In the embodiment described above, the configuration in which an external load continuously connected to the power source device 1 is the second motor generator 120 which consumes the AC power is exemplified. In addition to this, for example, another configuration in which the external load is a DC power consuming device (for example, an electric heater) may be used. Further, when the load is the DC power consuming device as described above, the configuration does not include the second inverter 20.

In the embodiment described above, the configuration is exemplified in which the first motor generator 110 temporarily functions as a motor by supplying the DC power from the power source body 40 to the first inverter 10 by turning on the third switch 63 when the rotor of the first motor generator 110 is turned in a case where the connection status is switched from the power source parallel connection status to the power supply serial connection state. In addition, for example, a further configuration may be provided in which the ECU 90 (power source control means) temporarily operates the internal combustion engine (power source) to rotate the rotor of the first motor generator 110 by the power of the internal combustion engine.

This configuration makes turning on of the third switch 63 for supplying power to the first inverter 10 unnecessary, so that the third switch 63 is kept off.

Next, after rotation of the rotor of the first motor generator 110 by the power of the internal combustion engine, the ECU 90 (inverter connecting means) turns on the fourth switch 64 and turns off the first switch 61, the second switch 62, the third switch 63, and the fifth switch 65 fifth switch 65. This makes the power source body 40 be in the single second power source status in which only the second secondary battery 42 outputs (i.e., connected to the external). Then the first inverter 10 is in a serial connection status in which the first inverter 10 is connected to the power source body 40.

In the embodiment described above, when the connection status is switched from the power source serial connection status to the power source parallel connection status, when the rotor of the first motor generator 110 is rotated to temporarily function as a motor, by supplying the DC power from the power source body 40 to the first inverter 10 by turning on the third switch 63. In addition, for example, there may be a configuration in which the ECU 90 (drive power source control means) temporarily operates the internal combustion engine (drive power source) to rotate the rotor of the first motor generator 110.

In this configuration, turning on of the third switch 63 for supplying the power to the first inverter 10 is made unnecessary and the third switch 63 is kept off.

Further, after rotation of the rotor of the first motor generator 110 with the power of the internal combustion engine, the ECU 90 (inverter connecting means) turns on the fourth switch 64 and turns off a first switch 61, the second switch 62, the third switch 63, and the fifth switch 65. This makes the power source body 40 be in the single second power source status in which only the second secondary battery 42 outputs (connected to the external). The first inverter 10 is in the serial connection status in which the first inverter 10 is connected to the power source body 40 in the single second power source status.

In the above-described embodiment, the configuration is exemplified in which the first power source is the first secondary battery 41. However, for example, there may be a configuration in which the first power source is a primary battery. This is true for the second power source (the second secondary battery 42).

DESCRIPTION OF REFERENCE SYMBOLS

1 power source device
10 first inverter
20 second inverter
10H first inverter positive terminal
10L first inverter negative terminal
20 second inverter
31 positive bus bar
32 negative bus bar
40 power source body
41 first secondary battery (first power source)
41H first power source positive terminal
41L first power source negative terminal
42 second secondary battery (second power source)
42H second power source positive terminal
42L second power source negative terminal
61 first switch
62 second switch
63 third switch
64 fourth switch
65 fifth switch
90 ECU
110 first motor generator
120 second motor generator

The invention claimed is:

1. A power source device comprising:

a power source including a first power source and a second power source;

a power source connection status switching means configured to make switching among a power source parallel connection status of the first and second power sources, a power source serial connection status of the first and second power sources, and a single second power source status in which only the second power source outputs;

an inverter connected to a motor generator; and an inverter connection status switching means configured to make switching between a first connection status in which the power source being in the power source parallel connection status or the power source serial connection status is connected to the inverter and a second connection status in which the inverter is connected to the power source in the single second power source status; wherein, when the power source connection status switching means makes the switching from the power source parallel connection status to the power source serial connection status, the switching to the power source serial connection status is made by the power source connection status switching means via a serial connection status between the second power source and the inverter operating as a power source by the motor generator functioning as a generator, and after the serial connection status, the power source connection status switching means makes the switching to the power source serial connection status, wherein the serial connection status is provided through:

the inverter connection status switching means making the switch to the first connection status to cause the inverter to operate the motor generator as a motor; and thereafter, the power source connection status switching means making the switching to the single second power source status; and the inverter connection status switching means making the switch to the second connection status.

2. The power source device as claimed in claim 1, wherein the first power source comprises a first power source positive terminal and a first power source negative terminal;

the second power supply comprises a second power source positive terminal and a second power source negative terminal;

the inverter includes an inverter positive terminal and an inverter negative terminal;

a positive bus bar connected to the second power source positive terminal;

a negative bus bar connected to the first power source negative terminal and the inverter negative terminal;

a first switch turning on and off connection between the first power source positive terminal and the positive bus bar;

a second switch turning on and off connection between the first power source positive terminal and the second power source negative terminal;

a third switch turning on and off connection between the positive bus bar and the inverter positive terminal;

a fourth switch turning on and off connection between the second power source negative terminal and the inverter positive terminal; and a fifth switch turning on and off connection between the second power source negative terminal and the negative bus bar.

3. The power source device as claimed in claim 1, wherein in the serial connection sets a serial connection status between the second power source and the inverter operating as a power source by the motor generator functioning as a generator, an electromotive force is generated in the inverter by rotation of the rotor of the motor generator.

4. A power source device comprising:

a power source including a first power source and a second power source;

a power source connection status switching means configured to make switching among a power source parallel connection status of the first and second power sources, a power source serial connection status of the first and second power sources, and a single second power source status in which only the second power source outputs;

an inverter connected to a motor generator; and an inverter connection status switching means configured to make switching between a first connection status in which the power source being in the power source parallel connection status or the power source serial connection status is connected to the inverter and a second connection status in which the inverter is connected to the power source in the single second power source status; wherein, when the power source connection status switching means makes the switching from the power source serial connection status to the power source parallel connection status, the switching to the power source parallel connection status is made by the power source connection status switching means via a serial connection status between the second power source and the inverter operating as a power source by the motor generator functioning as a generator, and after the serial connection status, the power source connection status switching means makes the switching to the power source parallel connection status, wherein the serial connection status is provided through:

the inverter connection status switching means making the switch to the first connection status to cause the inverter to operate the motor generator as a motor; and thereafter, the power source connection status switching means making the switching to the single second power source status; and the inverter connection status switching means making the switch to the second connection status.

5. The power source device as claimed in claim 4, wherein the first power source comprises a first power source positive terminal and a first power source negative terminal;

the second power supply comprises a second power source positive terminal and a second power source negative terminal;

the inverter includes an inverter positive terminal and an inverter negative terminal;

a positive bus bar connected to the second power source positive terminal;

a negative bus bar connected to the first power source negative terminal and the inverter negative terminal;

a first switch turning on and off connection between the first power source positive terminal and the positive bus bar;

a second switch turning on and off connection between the first power source positive terminal and the second power source negative terminal;

a third switch turning on and off connection between the positive bus bar and the inverter positive terminal;

a fourth switch turning on and off connection between the second power source negative terminal and the inverter positive terminal; and a fifth switch turning on and off connection between the second power source negative terminal and the negative bus bar.

6. The power source device as claimed in claim 4, wherein in the serial connection sets a serial connection status between the second power source and the inverter operating as a power source by the motor generator functioning as a generator, an electromotive force is generated in the inverter by rotation of the rotor of the motor generator.

7. A power source device comprising:

a power source including a first power source and a second power source;

power source connection status switching means configured to make switching among a power source parallel connection status of the first and second power sources, a power source serial connection status of the first and second power sources, and a single second power source status in which only the second power source outputs;

an inverter connected to a generator; and inverter connecting means configured to make a connection in a serial connection status in which the power source being in the single second power source status is connected to the inverter in series;

drive power source controlling means configured to control a drive power source for rotating a rotor of the generator; wherein, when the power source connection status switching means makes the switching from the power source parallel connection status to the power source serial connection status, the switching to the power source serial connection status is made by the power source connection status switching means via a serial connection status between the second power source and the inverter operating as a power source by the generator operating, and after the serial connection status, the power source connection status switching means makes the switching to the power source serial connection status, wherein the serial connection status is provided through:

the drive power source controlling means rotating the rotor, and thereafter, the power source connection status switching means making the switching to the single second power source status, and the inverter connecting means making the switching to the serial connection status.

8. The power source device as claimed in claim 7, wherein in the serial connection sets a serial connection status between the second power source and the inverter operating as a power source by the motor generator functioning as a generator, an electromotive force is generated in the inverter by rotation of the rotor of the motor generator.

9. A power source device comprising:

a power source including a first power source and a second power source;

power source connection status switching means configured to make switching among a power source parallel connection status of the first and second power sources, a power source serial connection status of the first and second power sources, and a single second power source status in which only the second power source outputs;

an inverter connected to a generator; and inverter connecting means configured to make a connection in a serial connection status in which the power source being in the single second power source status is connected to the inverter in series;

drive power source controlling means configured to control a drive power source for rotating a rotor of the generator; wherein, when the power source connection status switching means makes the switching from the power source serial connection status to the power source parallel connection status, the switching to the power source parallel connection status is made by the power source connection status switching means via a serial connection status between the second power source and the inverter operating as a power source by the generator operating, and after the serial connection status, the power source connection status switching means makes the switching to the power source serial connection status, wherein the serial connection status is provided through:

the drive power source controlling means rotating the rotor, and thereafter, the power source connection status switching means making the switching to the single second power source status, and the inverter connecting means making the switching to the serial connection status.

10. The power source device as claimed in claim 9, wherein in the serial connection sets a serial connection status between the second power source and the inverter operating as a power source by the motor generator functioning as a generator, an electromotive force is generated in the inverter by rotation of the rotor of the motor generator.

* * * * *